United States Patent [19]
Crawford

[11] 3,785,573
[45] Jan. 15, 1974

[54] MATERIAL DISCHARGE AND SPREADING APPARATUS FOR FLUENT MATERIAL

[75] Inventor: Alexander Crawford, Warwick, England

[73] Assignee: Massey-Ferguson-Perkins Limited, London, England

[22] Filed: July 24, 1972

[21] Appl. No.: 274,788

[30] Foreign Application Priority Data
July 23, 1971  Great Britain .................. 34,669/71

[52] U.S. Cl. ............................... 239/658, 239/681
[51] Int. Cl. ............................................. A01c 3/06
[58] Field of Search .................... 222/178, 176, 404, 222/410; 239/658, 659, 681

[56] References Cited
UNITED STATES PATENTS
3,229,984   1/1966   McLeland ...................... 239/658 X

Primary Examiner—Stanley H. Tollberg
Attorney—Shortley & Farris

[57] ABSTRACT

A manure spreader with a rotor mounted on a rotatable shaft which extends lengthwise of a manure container. The rotor is moved lengthwise of the shaft during rotation by a chain extending in two runs round two rotatable pocket wheels carried by the shaft. One of the pocket wheels is driven to move the rotor along the shaft.

11 Claims, 10 Drawing Figures

MATERIAL DISCHARGE AND SPREADING APPARATUS FOR FLUENT MATERIAL

This invention relates to material discharge apparatus and in particular, though not exclusively, to such apparatus in the form of a mobile agricultural manure spreader.

It has been previously proposed to provide a manure spreader in which a rotary discharge element for the manure progressively moves along a manure container to discharge the manure but certain aspects of this arrangement and in particular the means by which the discharge element is moved along the container have hitherto been unsatisfactory and it is an aim of the present invention to provide improvements in this respect.

The invention provides material discharge apparatus comprising a container, a discharge shaft mounted within the container for rotation about an axis extending lengthwise of the shaft, means for rotating the shaft about said axis, a material discharge element mounted on the shaft, the material discharge element being drivably coupled to the shaft for rotation therewith, and a traversing mechanism to move the material discharge element lengthwise with respect to the shaft while the shaft is rotating, the traversing mechanism comprising a flexible tensile member mounted on the shaft and rotatable therewith, a rotatable drive member mounted on the shaft, the flexible tensile member being connected to the material discharge element and drivably engaging the drive member, and a drive mechanism to rotate the drive member relative to the shaft whereby the material discharge element is pulled lengthwise of the shaft by the tensile member.

An embodiment of the invention will now be described by way of example with reference to the accompanying drawings in which.

Figure 1:
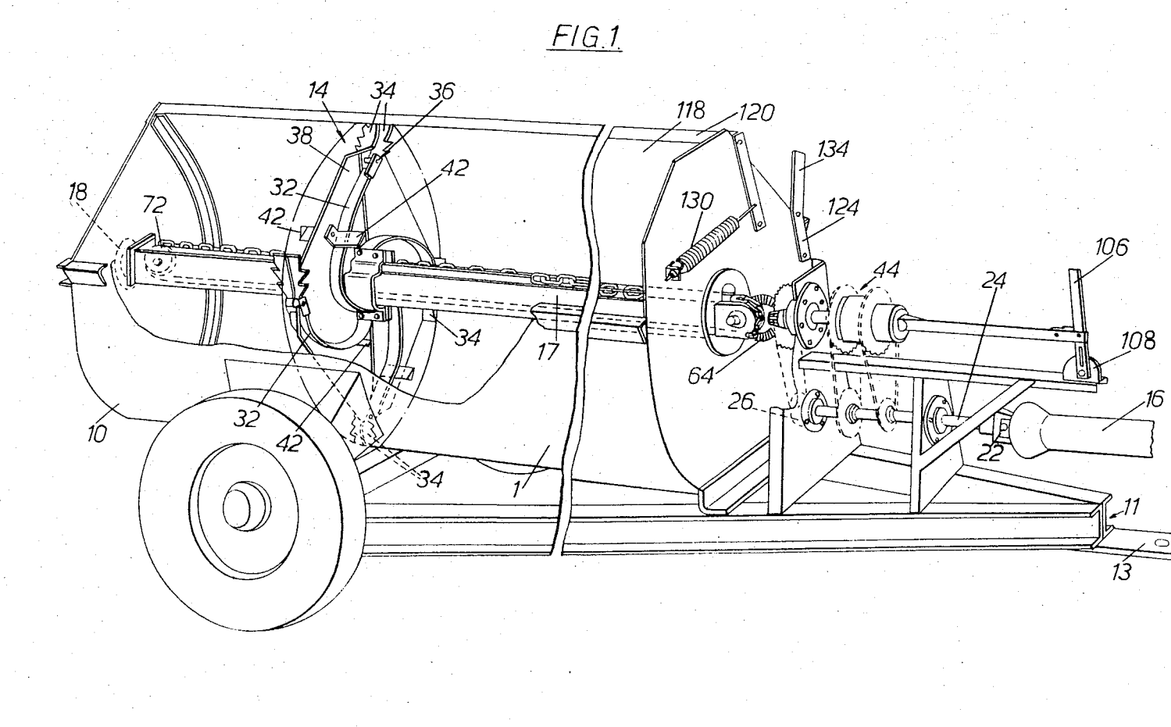
FIG. 1 shows a perspective view, partly cut-away, of a manure spreader.

As shown in FIG. 1, a manure spreader comprises a manure container 10 mounted on a chassis 11 which is carried on wheels 12 and has a towbar 13 so that it may be trailed by a tractor (not shown), and a rotary material discharge element or rotor 14 mounted in the container and driven from the power take-off shaft 16 of the tractor to shred and discharge the manure.

The lower portion of container 10 is formed as part of a cylinder and the rotor 14 is constructed and positioned so as to sweep across the said lower portion in close proximity thereto.

The rotor 14 is mounted on a discharge shaft 17 which has a rectangular or box section, and on one side of the box the shaft is provided along its length with upstanding confronting L-shaped flanges 19 (see FIG. 9) defining a slot and formed thereon for a purpose to be described.

Discharge shaft 17 extends along the length of the container 10 and is journalled in bearings 18, 20 at its opposite ends. Drive is transmitted to shaft 17 from a shaft 16 connectible to a tractor's p.t.o. shaft (not shown) through a universal joint 22, a counter shaft 24 and a chain drive including sprockets 26, 28 mounted respectively on the counter shaft 24 and the rotor shaft.

Figures 5, 6:
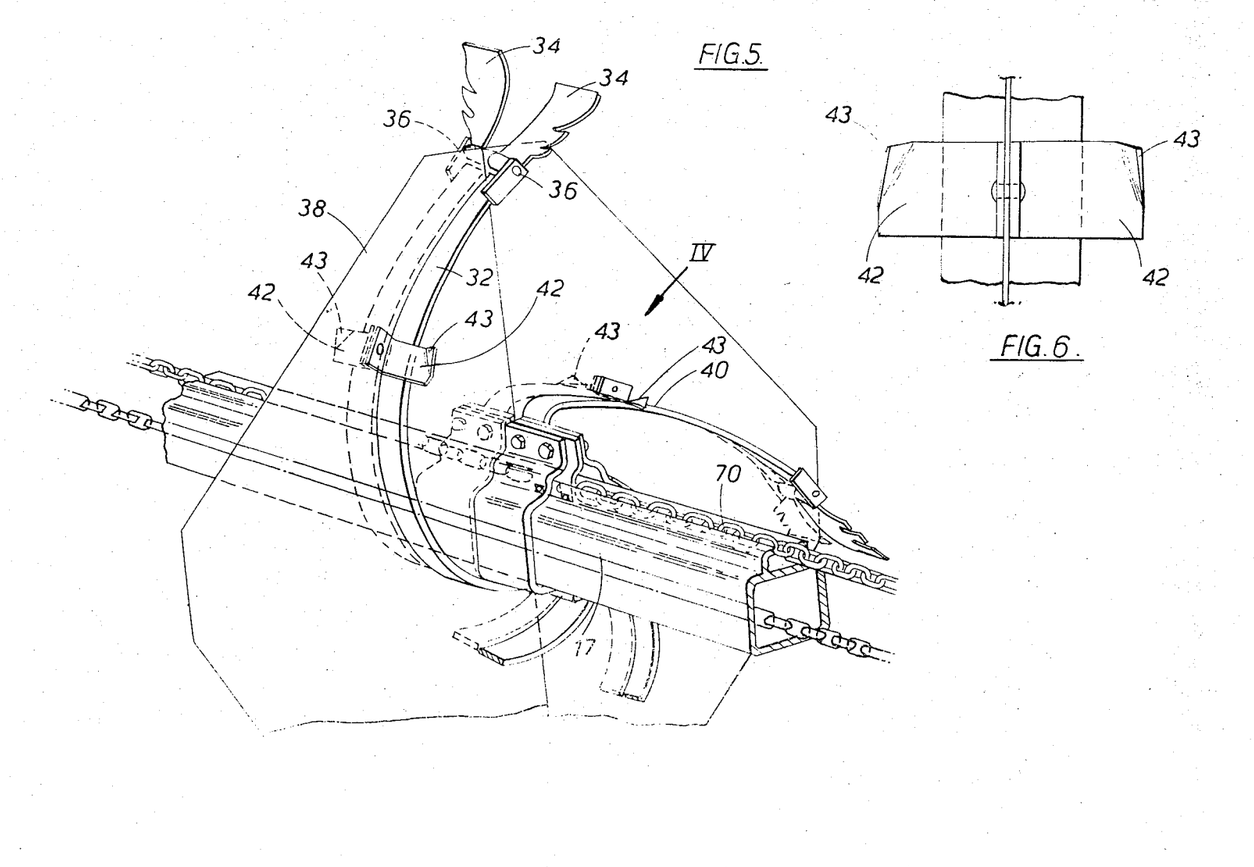
FIG. 5 shows a perspective view of part of a material discharge element or rotor shown in FIG. 1.
FIG. 6 shows a scrap view on arrow VI in FIG. 5.

Rotor 14 is mounted for rotation with, and sliding movement along discharge shaft 17, and comprises a central hub 30 shaped to be a sliding fit on shaft 17, and four equally angularly spaced curved arms 32 mounted on the hub and each having a pair of rigid flails 34 connected thereto through hinges 36 at the end of the arm. A square disc 38 having truncated corners is mounted at a position equally spaced from the opposite axially spaced ends of the hub and divides each arm 32 into two parts, one on each side of the disc, and is welded to the arms along the lengths thereof.

A pair of rectangular fingers having bent up tear out edges 43 is provided on each arm 32 to assist in discharging the manure. The four pairs of fingers are located at successively greater distances along the arms from the hub 30.

Figure 2:
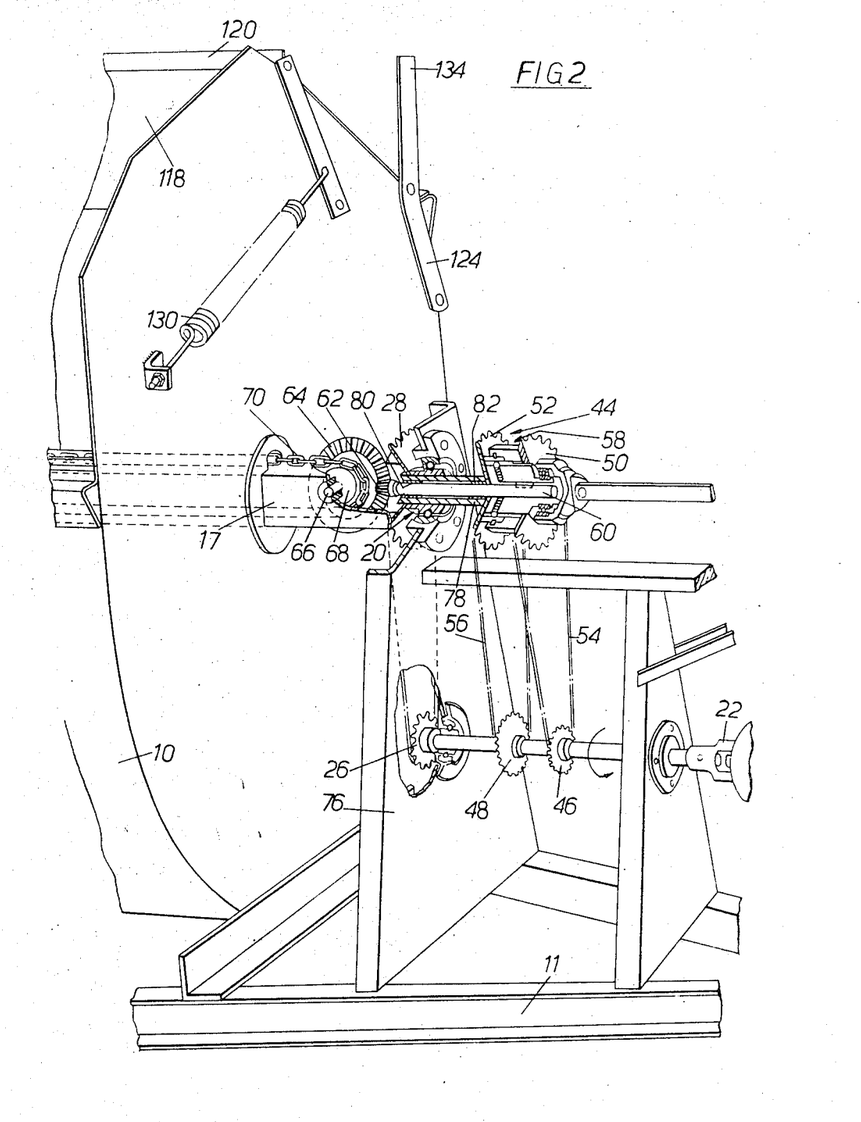
FIG. 2 shows a perspective view, partly sectioned of a portion of the spreader of FIG. 1, on a larger scale.

A traversing mechanism 44 is provided to slide rotor 14 along discharge shaft 17. As shown in FIG. 2, the traversing mechanism includes first and second sprockets 46, 48 mounted on counter shaft 24 and associated third and fourth sprockets 50, 52 driven therefrom by chains 54, 56. Chain drive 46, 54 50 provides a lower drive ratio than the drive 48, 56, 52. A clutch 58 permits sprockets 50, 52 to be selectively connected to a second counter shaft 60 carrying a bevel gear 62 meshing with an annular gear 64 mounted on rectangular shaft 17.

Annular gear 64 is mounted on a rod 66 journalled in the end of shaft 17. The rod carries a pocket wheel 68 so that drive may be transmitted to the pocket wheel from the annular gear. A flexible tensile member in the form of a chain 70 extends along the length of shaft 17 on both sides thereof in two runs, passing around pocket wheel 68 at one end and a similar rotatable pocket wheel 72 at the other end. The chain is connected to hub 30 of rotor 14 at a point along the run of the chain which is located between flanges 19, to move the rotor along shaft 17.

With reference to FIG. 2, sprocket 28 is welded to the end of rotor shaft 17 and has a central opening in which an axially extending sleeve 78 welded to sprocket 52 is a running fit. Sleeve 78 is rotatably supported on an upstanding bracket 76 by the self-aligning bearing 20. The bracket 76 is carried by the manure spreader chassis 11.

The second counter shaft 60 is supported within the sleeve 78 for rotation relative thereto on two internal lands 80, 82 formed in the sleeve one at each end thereof.

Figure 3:
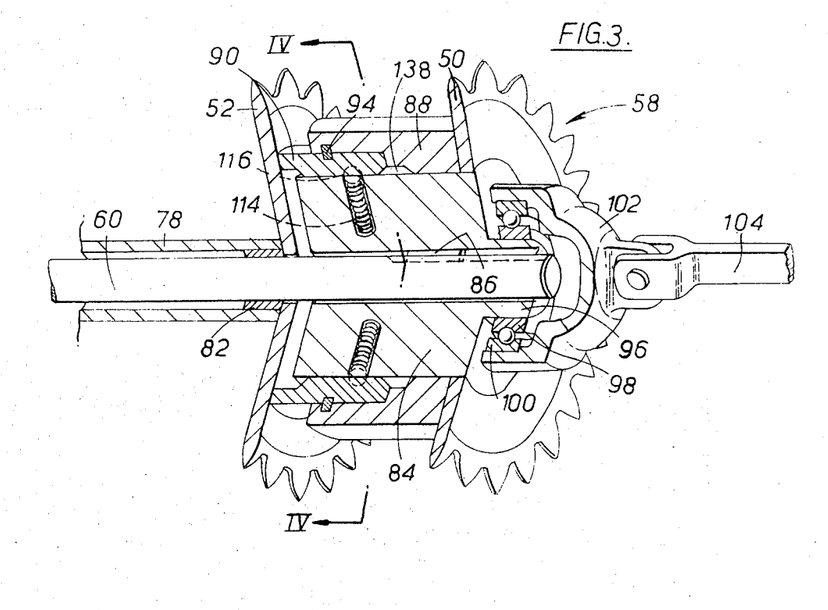
FIG. 3 shows a sectioned perspective view of a clutch of the spreader of FIGS. 1 and 2 on a larger scale.

As shown in FIG. 3, the clutch 58 comprises a central hub member 84 supported on second counter shaft 60 on the forward side of sprocket 52. A key 86 is a sliding fit in aligned keyways in the hub and the shaft 60 whereby the hub is slidable along the shaft but is at all times drivably coupled thereto.

Sprocket 50 is a running fit on hub 84 and has a rearwardly-extending tubular extension or sleeve 88 welded thereto which is likewise a running fit on the hub. A corresponding forwardly-extending sleeve 90 is welded to sprocket 52 and is a running fit within a stepped diameter portion 92 of sleeve 88. A circlip 94 prevents axial movement of the sleeves 88, 90 relative to each other.

The forward end of hub 84 is formed with a tubular extension 96 on which the inner annulus 98 of a ball race is a tight fit. The outer annulus 100 of the ball race carries a bell housing 102 to which one end of an operating link 104 for the clutch 58 is pivoted. The other end of the link is connected to an operating handle 106 (see FIG. 1) which can be fixed in forward or rearward positions, or in an intermediate position by engagement of a spring member on the handle with corresponding detents on a fixed member 108. The handle 106 enables hub 84 to be moved relative to shaft 60 and sleeves 88, 90 and to be held in corresponding rearward, forward and intermediate positions.

Figure 4:
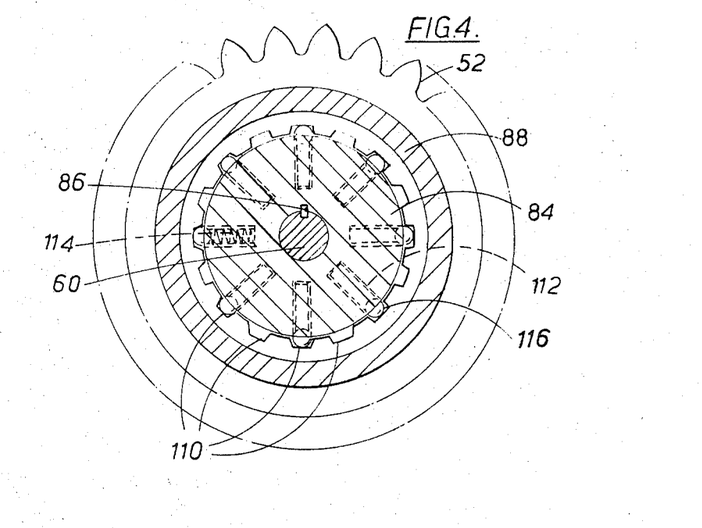
FIG. 4 shows a cross-section on a plane indicated by the line IV — IV in FIG. 3.

The internal surface of sleeve 90 is formed with multiple equally angularly spaced axially extending grooves or splines 110 (see FIG. 4) and similar grooves (not shown) are formed in the internal surface of sleeve 88. Eight correspondingly spaced radial drillings 112 are formed in the hub 84 in each of which is located a coiled compression spring 114 urging a steel ball 116 radially outwardly into the grooves 110 formed in the sleeves 88 and 90.

The manure container 10 is provided with a hood or baffle 118 to give the manure a suitable trajectory as it is discharged by the rotor 14. The hood comprises a flat pressed metal sheet having upturned lips or flanges along its edges 120, and is mounted for movement between a raised in-use position shown in FIG. 1 and a lowered position shown in FIG. 10. In the FIG. 1 position loading of the container 10 can be effected from the right hand side only of the spreader. In the FIG. 10 position of the hood loading can be effected from either side.

Figure 10:
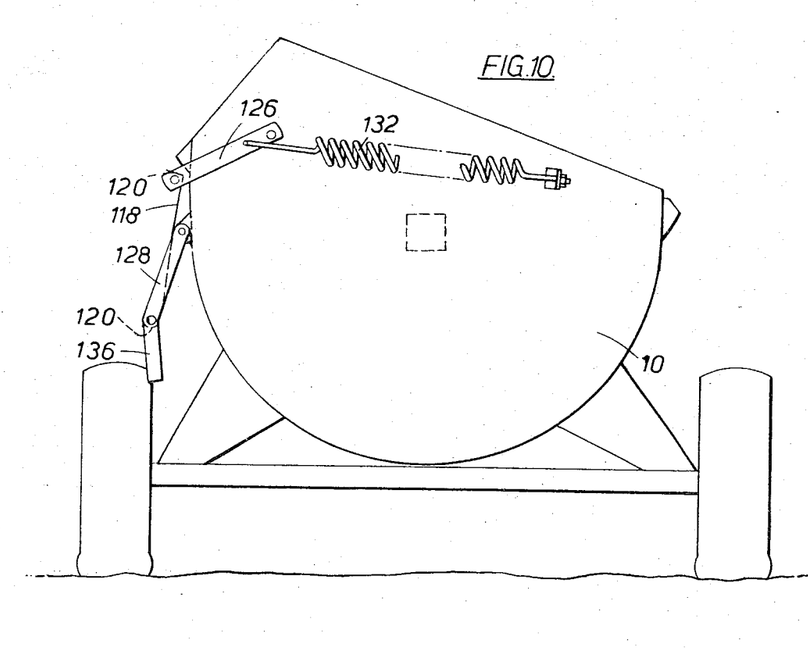
FIG. 10 shows a rear end elevation of the manure spreader.

The hood 118 is mounted on the container 10 by means of pairs of levers 122, 124; 126, 128, at each end of the spreader (see FIGS. 1 and 10). Each lever is pivotally connected at one end to the hood and at its other end to the container 10. Coiled tension springs 130 and 132 are connected between the container 10 and the levers 122 and 126 respectively, and are positioned to go over-centre as the hood moves between the FIG. 1 and FIG. 10 positions thereby to positively hold the hood in either position. Handles 134 and 136 are formed as continuations of the levers 124 and 128 respectively, whereby the hood can be swung between the FIG. 1 and FIG. 10 positions from either end of the spreader.

Figure 7:
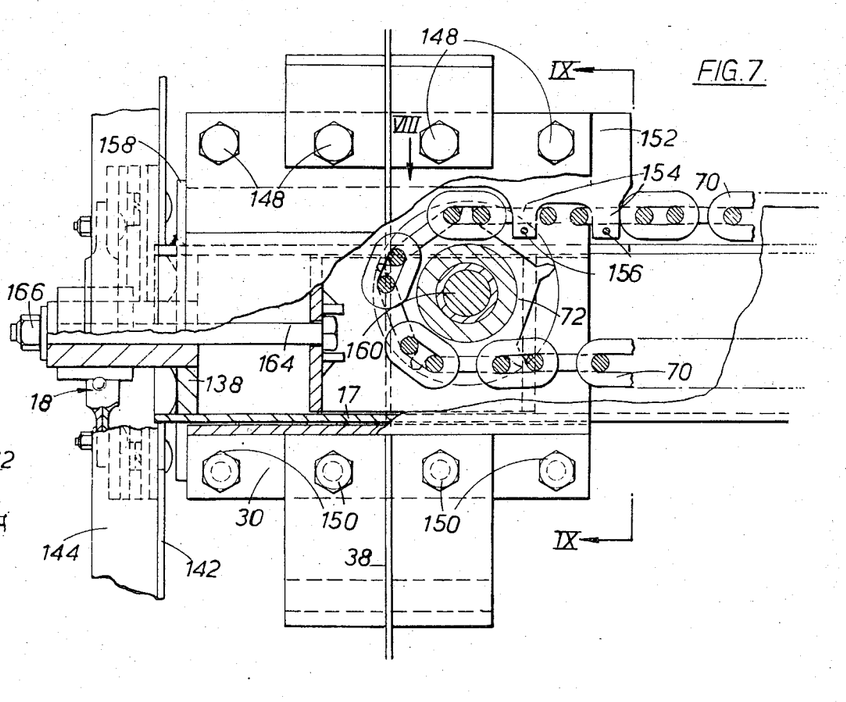
FIG. 7 shows a partly sectioned view of the rear end of a discharge shaft supporting the rotor of FIG. 5, the rotor being shown in its rearmost position.
Figure 8:
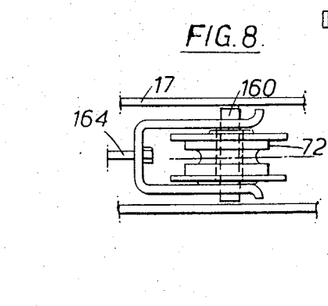
FIG. 8 shows a scrap view on arrow VIII in FIG. 7.

As shown in FIG. 7, rotor shaft 17 has a plug 138 welded within it at its rear end. Plug 138 has a central opening to receive a short tubular shaft 140 and is welded to the shaft. Ball race 18, mounted on the rear end wall 142 of the manure container 10 through brackets 144, supports shaft 140 and therefore the rear end of rotor shaft 17 also.

Figure 9:
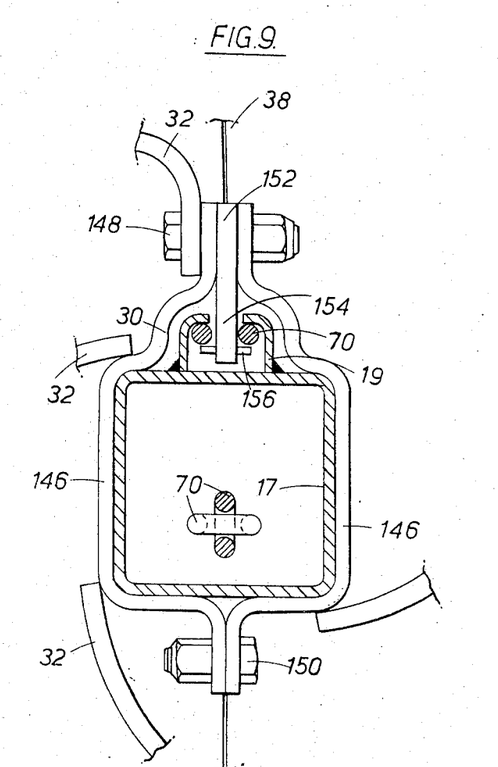
FIG. 9 shows a cross section on the line IX — IX in FIG. 7.

As shown in FIG. 9, hub 30 comprises a pair of shaped hub elements 146 held together by means of two series of bolts 148, 150. A plate 152 having two inwardly projecting fingers 154 is sandwiched between the hub elements adjacent flanges 19. The fingers fit into the opposite end links of the chain 70 to join the ends thereof and allow the rotor 14 to be pulled along by the chain. Wire pins 156 prevent the chain ends becoming detached from the fingers. A stop plate 158 is welded to rotor shaft 17 adjacent its rear end for engagement with hub 30 to stop rearward movement of the rotor at the position shown in FIG. 7.

Pocket wheel 72 is mounted so as to be adjustable in position to change the tension in chain 70. The pocket wheel is journalled on a spindle 160 in a U-shaped carrier 162 slidably located within rotor shaft 17. A bolt 164 extends rearwardly from the base and rear end of carrier 162 through shaft 140, and a nut 166 and associated washer permit simple adjustment of chain tension.

Operation of the manure spreader will now be described.

The container 10 is filled with manure, the hool 118 put in the FIG. 1 position, the drawbar 13 hitched to a tractor and the shaft 16 connected to the tractor's p.t.o. shaft. Drive is transmitted from shaft 16 through counter shaft 24, sprockets 26 and 28 to the discharge shaft 17 to effect rotation thereof and thereby to rotate rotor 14 clockwise as viewed from the rear.

When the rotor 14 is accelerated from the stationary condition, the flails 34 at first swing back towards a position in which they are tangential to the direction of rotation of the disc thereby reducing the starting torque required from the tractor's p.t.o. shaft. Centrifugal force then causes the flails to swing outwardly to the positions shown in FIG. 1 in which they shred the manure and fling it out on the right hand side of the spreader.

Rotation of counter shaft 24 also rotates sprocket 48 and transmits drive through chain 56 (see FIG. 2) to sprocket 52. Likewise, sprocket 50 is also rotated, but at a slightly slower rate than sprocket 52 due to sprocket 46 being smaller than sprocket 48. With hub 84 in the position shown in FIG. 3 drive is transmitted from sprocket 52 through sleeve 90, balls 116, hub 84, key 86 shaft 60, bevel gear 62, and ring gear 64 to pocket wheel 68. The rate of rotation of bevel gear 62 is just greater than that which would be required to prevent rotation of the ring gear about the axis of rod 66. Thus pocket wheel 68 is slowly rotated, and the chain 70 drags rotor 14 along shaft 17 in a rearward direction as the shaft rotates, thereby causing the rotor to progressively discharge all the manure in the container 10.

When the rotor reaches one end of the container clutch 58 slips and ceases transmission of drive to chain 70. Container 10 is then refilled with manure and lever 106 pulled forwardly to move hub 84 (FIG. 3) forwardly and brings the balls 116 into the grooves 110 in sleeve 88. Drive is now transmitted to shaft 60 via sprocket 50 while sprocket 52 is free to rotate relative to hub 84 as sprocket 50 had previously been. The slightly lower rate of rotation of sprocket 50 causes bevel gear 62 to rotate at a rate just less than that which is required to prevent rotation of ring gear 64 about the axis of rod 66. The direction of rotation of pocket wheel 68 is therefore reversed and the rotor 14 is hauled down the container 10 in the forward direction.

With reference to FIG. 3, it will be noted that an annular channel 138 is defined by the sleeves 88, 90. When hub 84 is moved by lever 106 to its intermediate position in which balls 116 are located in the channel, neither of the sprockets 50, 52 is connected to hub 84, second counter shaft 60 is free to rotate and therefore no drive is transmitted to chain 70 to move rotor 14 along rectangular shaft 17, through the shaft 17 and rotor can still be rotated. This may be desirable in certain instances, for example when liquid or semi liquid manure is to be discharged. The rotor 14 can be positioned centrally along the length of the container 10 — thereby reducing instability of the manure during transport — and rotated to completely discharge the manure without the need to move the rotor along the rectangular shaft.

The main advantages of the embodiment described above over previously-proposed manure spreaders in which a rotor is progressively moved through a manure container are the simplicity, low cost, and ruggedness combined with comparatively low weight of the mechanism which moves the rotor relative to the manure container.

Also, since the two flails of each pair of flails 34 are mounted for independent pivotal movement, the flail on the side of the disc 38 facing away from the mass of manure is lightly loaded compared with the other flail and therefore aligns itself nearer to a radial direction with respect to the disc. The lightly loaded flail therefore ensures that the last remnants of manure are discharged.

Other advantages are the built-in overload clutch, the reversibility of the direction of movement of rotor 14 along shaft 17 — thereby making it unnecessary to return the rotor to a given starting position before refilling the container 10 with manure. Also, the torque required to start rotor 14 from rest is quite low — this reduces the likelihood of damage to a tractor's p.t.o. system. In addition, the mechanism 44 for moving rotor 14 along shaft 17 is in a position where it does not get fouled with manure, is easily guarded and easily lubricated. For this reason it is unlikely that the mechanism will jam or seize even after long use.

Embodiments falling within the scope of the invention include a rotor in which a circular disc corresponding to the disc 38 is provided, the size of the disc being similar to that of the disc 38. Alternatively the circular disc may be proportioned to fit closely within the manure container (with about 1 inch clearance), the flails 34 being pivotally mounted inwardly of the edge of the disc at the same proximity to the walls of the container as in the embodiment described above. Also, if desired the two flails 34 of each pair of flails could be formed as a single rigid flail — except in an embodiment in which the disc is proportioned to fit closely within the manure container — a portion of the disc being cut away on the trailing side of each flail to allow the flail to lie back on commencing work so as to reduce the starting torque required.

I claim:

1. Material discharge apparatus comprising a container, a discharge shaft mounted within the container for rotation about an axis extending lengthwise of the shaft, means for rotating the shaft about said axis, a material discharge element mounted on the shaft, the material discharge element being drivably coupled to the shaft for rotation therewith, and a traversing mechanism to move the material discharge element lengthwise with respect to the shaft while the shaft is rotating, the traversing mechanism comprising a flexible tensile member mounted on the shaft and rotatable therewith about said axis extending lengthwise of the shaft, a rotatable drive member mounted on the shaft, the flexible tensile member being connected to the material discharge element and drivably engaging the drive member, and a drive mechanism to rotate the drive member relative to the shaft whereby the material discharge element is pulled lengthwise of the shaft by the tensile member.

2. The material discharge apparatus of claim 1 in which said flexible tensile member is arranged in two runs and extends round said rotatable drive member at one end of said runs and round a second rotatable member at the other end.

3. The material discharge apparatus of claim 2 in which one of said two runs is disposed externally of said discharge shaft and the other run is disposed internally of said shaft.

4. The material discharge apparatus of claim 1 in which said drive mechanism comprises a drive shaft, means for power rotating the drive shaft, a first gear on the drive shaft, and a second gear rotatably mounted on the discharge shaft so as to be in constant mesh with the first gear the second gear being drivably coupled to the rotatable drive member.

5. The material discharge apparatus of claim 4 wherein said drive shaft and said discharge shaft are adapted to be driven from a common power input connection.

6. The material discharge apparatus of claim 5 wherein said means for power rotating the drive shaft includes a ratio changer operative to change the ratio of the drive train to the drive shaft relative to the ratio of the drive train to the discharge shaft whereby the direction of movement of the material discharge element relative to the discharge shaft may be changed.

7. The material discharge apparatus of claim 6 wherein said ratio changer comprises two different ratio drives to said drive shaft, and a clutch for selectively clutching either of said drives to said drive shaft.

8. The material discharge apparatus of claim 1 wherein said flexible tensile member is constituted by a stud link or open link chain and said rotatable drive member is in the form of a pocket wheel.

9. The material discharge apparatus of claim 7 wherein said clutch is constructed so as to slip at a torque slightly greater than its normal working torque.

10. The material discharge apparatus of claim 6 wherein said material discharge element comprises a hub constructed for sliding engagement with the discharge shaft, a plate carried by the hub, and material tear out formations projecting axially with respect to said discharge shaft provided on both sides of the plate.

11. The material discharge apparatus of claim 1 wherein said material discharge element comprises a plate lying in a plane at right angles to the axis of rotation of the discharge shaft and at least one pair of flails pivotally mounted on opposite sides of the plate adjacent its outer periphery.

* * * * *